(12) United States Patent
De La Rue

(10) Patent No.: US 8,229,473 B1
(45) Date of Patent: Jul. 24, 2012

(54) GEO-FENCE

(75) Inventor: Michael David De La Rue, Warsaw (PL)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/151,443

(22) Filed: Jun. 2, 2011

(51) Int. Cl.
*H04Q 7/20* (2006.01)

(52) U.S. Cl. ............... 455/456.5; 455/456.6; 455/456.1; 701/44.7

(58) Field of Classification Search ............... 455/456.5, 455/456.6, 456.1; 701/44.7
See application file for complete search history.

(56) References Cited

U.S. PATENT DOCUMENTS

| | | | |
|---|---|---|---|
| 2005/0153705 A1* | 7/2005 | Gramakov et al. | 455/456.1 |
| 2007/0060126 A1* | 3/2007 | Taniguchi et al. | 455/436 |
| 2009/0143078 A1* | 6/2009 | Tu et al. | 455/456.3 |
| 2010/0178931 A1* | 7/2010 | Busropan et al. | 455/456.1 |
| 2010/0285813 A1* | 11/2010 | Harper | 455/456.1 |
| 2011/0028159 A1* | 2/2011 | Snapp | 455/456.1 |
| 2011/0092185 A1* | 4/2011 | Garskof | 455/411 |

* cited by examiner

*Primary Examiner* — Danh Le
(74) *Attorney, Agent, or Firm* — Squire Sanders (US) LLP

(57) ABSTRACT

The present invention relates to methods and apparatus for detecting when a mobile communication device exits a defined geographical area wherein the defined geographical area includes one or more cells. A cell that the mobile communication device is in communication with is identified and it is determined if the identified cell is a boundary cell, wherein a boundary cell is a cell in which a boundary of the defined geographical area is within the cell. The location of the mobile communication device is determined if the identified cell is a boundary cell and the location of the mobile communication device is compared with the boundary of the defined geographical area to detect if the mobile communication device has exited the defined geographical area.

15 Claims, 2 Drawing Sheets

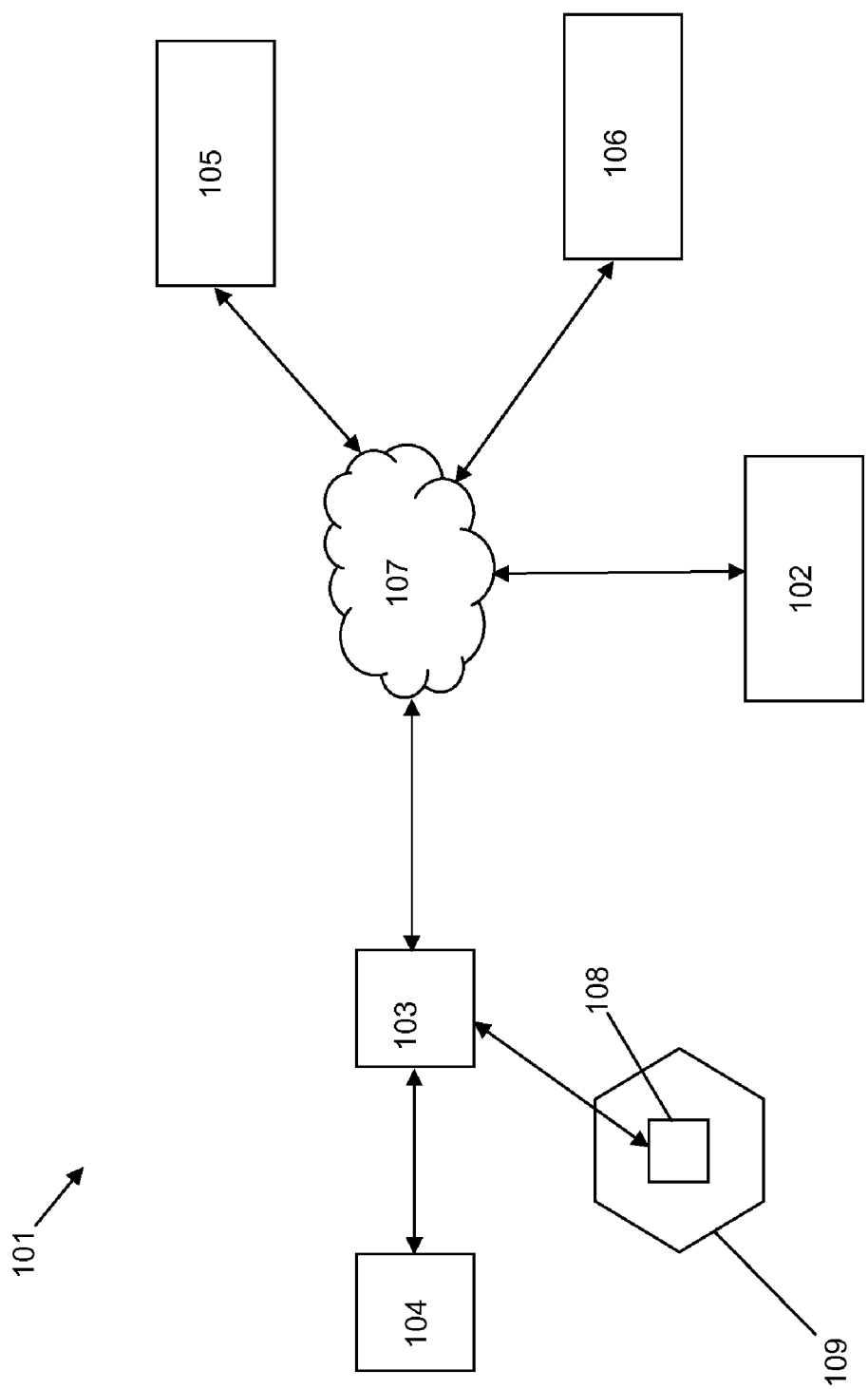

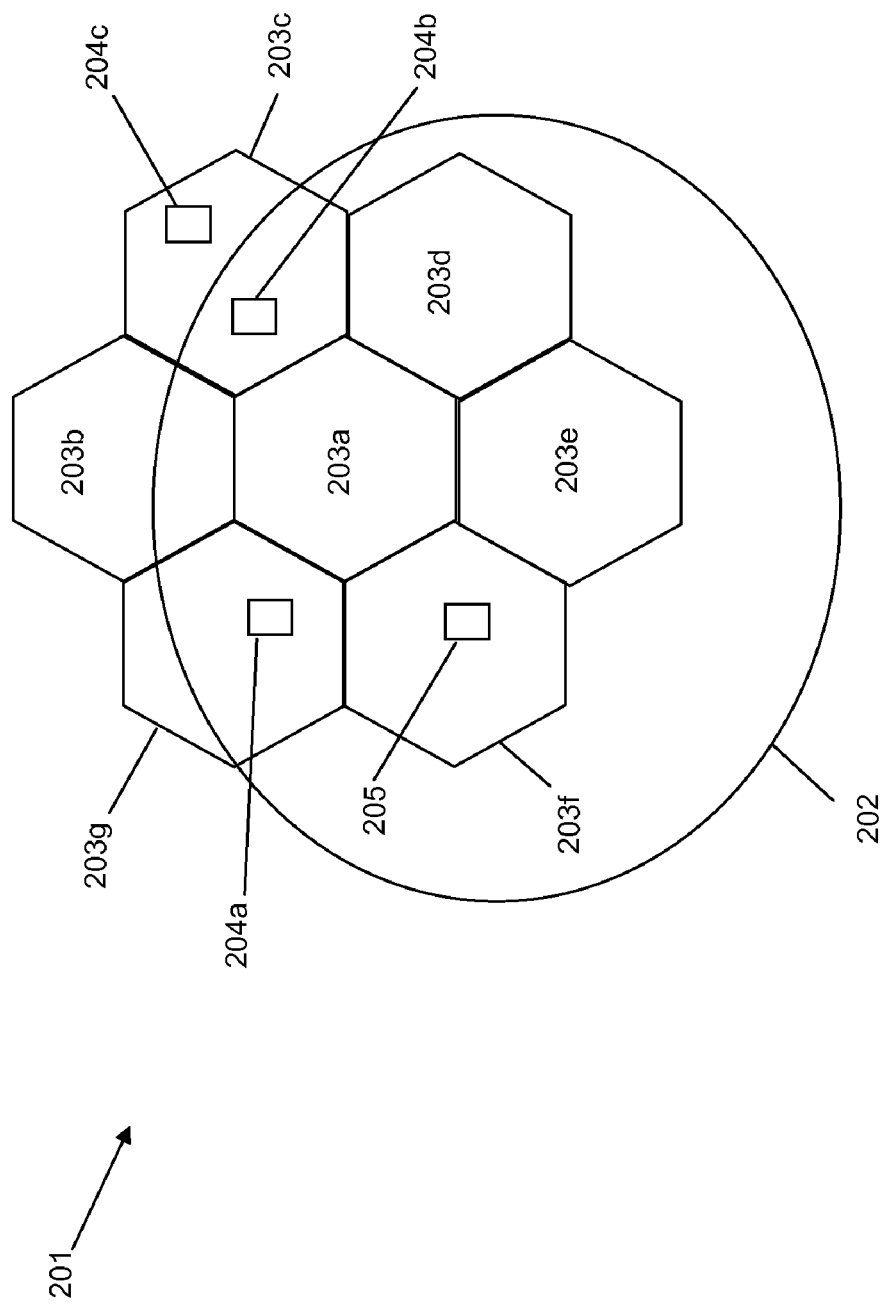

GEO-FENCE

The present invention relates to Geo-Fences and, in particular, to power saving in Geo-Fence applications.

Typically, a geo-fence is a virtual perimeter or boundary that is defined for a real-world geographical area. The geo-fence works with location enabled or aware devices. If the location enabled device enters or exits a geo-fence that is associated with the location enabled device then some form of notification or alert may be triggered, either to the device or to one or more third parties.

For example, a parent may set a geo-fence boundary between the parent's home and their child's school so that if the child exits the geo-fence area then the parent may receive an alert that the child has left the defined geo-fence. Rental car companies may define a geo-fence for a customer and the rental car company may receive an alert and/or the customer if the customer exits the agreed or defined geo-fence area. As will be appreciated, there are many different reasons or applications to which the geo-fence may be defined.

In order to be able to operate and implement geo-fences, a mobile location enabled device needs to monitor the current location of the device. In order to obtain an accurate determination of the location of the mobile device Global Positioning System (GPS) measurements are made by the mobile device and typically reported to a server or management system that can determine whether the mobile device is inside or outside the geo-fence defined for the mobile device.

However, in order to accurately determine whether the mobile device is inside or outside the associated geo-fence continuous GPS measurements are required which is expensive in terms of processing, obtaining and, in particular, in terms of battery power of the mobile device. Therefore, the mobile device may substantially quickly drain battery power by continuously obtaining GPS measurements rendering the mobile device out of service until it is re-charged which means that it cannot be determined if the mobile device is inside or outside its associated geo-fence. If the mobile device is a mobile telephone then being out of service quickly is a substantial drawback as mobile telephones are relied upon to be able to make calls, amongst other things.

The present invention aims to address, at least in part, some or all of the problems and/or drawbacks described hereinabove.

According to a first aspect of the present invention there is provided a method of detecting when a mobile communication device exits a defined geographical area wherein the defined geographical area includes one or more cells; the method comprising the steps of: identifying a cell that the mobile communication device is in communication with; determining if the identified cell is a boundary cell, wherein a boundary cell is a cell in which a boundary of the defined geographical area is within the cell; determining a location of the mobile communication device if the identified cell is the boundary cell; and comparing the location of the mobile communication device with the boundary of the defined geographical area to detect if the mobile communication device has exited the defined geographical area.

The method may be implemented by server, by a mobile communication device or any combination thereof. A geographical area is defined, which may be referred to as a Geo-Fence, where the defined geographical area defines an area that the mobile communication device is not allowed to exit. The geographical area may be defined in terms of a real-world area. By referring to the defined geographical area as an area the mobile communication device is not allowed to exit then the geographical area is an area that the mobile communication device has to stay within.

The method identifies a cell that the mobile communication device is communicating with. The cell is a geographical area that is served by a base station. The base station enables mobile communication for the mobile communication device and the cell may be identified by a cell identification or the cell may be identified from a base station identification as one base station serves a cell and therefore if one knows the base station one can identify the cell and vice-versa.

The method determines if the cell is a boundary cell. For example, the identified cell may cover a known, or can be determined, geographical area then by comparing the geographical area of the cell with the defined geographical area (e.g. the Geo-Fence) then it may be determined if a boundary (including any part of the boundary) of the defined geographical area falls with in the geographical area of the identified cell. If it does then the cell is a boundary cell.

If the cell is determined to be a boundary cell then a location of the mobile communication device is determined. For example, the mobile communication device may be requested or instructed to obtain Global Positioning System (GPS) location data for the mobile device, or any other means to substantially accurately determine the location of the mobile communication device may be used.

The location of the mobile communication device may then be compared with the boundary of the defined geographical area in order to detect whether the mobile communication device has exited the defined geographical area.

The method may further comprise the steps of triggering one or more actions if the mobile communication device is determined to have exited the defined geographical area.

The actions that may be triggered may be any action defined. The actions may be stored in a database and associated with the defined geographical area, associated with the mobile communication device or any combination thereof. The actions are triggered when the mobile communication device exits the defined geographical area. The actions may be to transmit an alert or notification to the mobile communication device or any other device. The actions may be to activate charging/billing systems, the actions may be to record the date, time etc, of the time that the mobile device exited the geographical area and may additionally trigger the system to record when the mobile communication device re-enters the defined geographical area. Thus, any number of actions may be defined and any number of actions triggered.

The step of determining the location of the mobile communication device may further comprise the steps of periodically determining the location of the mobile communication device. Thus, if it is determined that the mobile communication device is in the boundary cell but has not exited the defined geographical area then the location of the mobile communication device may be periodically determined in order to periodically determine if the mobile communication device has exited the defined geographical area. The period for periodically determining the location of the mobile communication device may be every 1 minute, 5 minutes, 10 minutes, and so on. The period may be any period suitable. The location may be periodically determined whilst the mobile communication device is in the boundary cell and stop once the mobile communication device is no longer in a boundary cell.

The step of determining the location of the mobile communication device may further comprise the step determining if the mobile communication device is moving and, if so, determining the location of the mobile communication device. Thus in order to conserve battery power the location the mobile communication device may be determined once it is determined that the mobile communication device is moving within the boundary cell.

The method may further comprise the step of maintaining a record of the defined geographical area and the mobile communication device associated with the defined geographical area.

The method may further comprise the step of receiving an identification of the cell that the mobile communication device is in communication with from the mobile communication device. The cell may be identified from communications between the mobile communication network and the mobile communication device. The cell may be identified from an identification of a base station that serves the cell. The identification of the cell may include requesting the information from a network management system or the mobile communication device and receiving the cell identification.

The step of determining if the identified cell is a boundary cell may comprise the steps of determining a geographical coverage area of the identified cell; and comparing the geographical coverage area of the identified cell with the defined geographical area.

The step of determining the location of the mobile device may comprise the steps of instructing the mobile communication device to obtain its location; and receiving the location of the mobile communication device.

According to a second aspect of the present invention there may be provided an apparatus for detecting when a mobile communication device exits a defined geographical area wherein the defined geographical area includes one or more cells; the apparatus comprises: a first processor adapted to identify a cell that the mobile communication device is in communication with; a second processor adapted to determine if the identified cell is a boundary cell, wherein a boundary cell is a cell in which a boundary of the defined geographical area is within the cell; a third processor adapted to determine a location of the mobile communication device if the identified cell is the boundary cell; and a fourth processor adapted to compare the location of the mobile communication device with the boundary of the defined geographical area to detect if the mobile communication device has exited the defined geographical area.

According to a third aspect of the present invention there is provided an apparatus for detecting when a mobile communication device exits a defined geographical area wherein the defined geographical area includes one or more cells; the apparatus being adapted to: identify a cell that the mobile communication device is in communication with; determine if the identified cell is a boundary cell, wherein a boundary cell is a cell in which a boundary of the defined geographical area is within the cell; determine a location of the mobile communication device if the identified cell is the boundary cell; and compare the location of the mobile communication device with the boundary of the defined geographical area to detect if the mobile communication device has exited the defined geographical area.

The apparatus may be adapted by hardware, software or any combination thereof. The processors to determine, identify, or compare may be adapted to communicate with one or more inputs and/or outputs in order to request, transmit, and/ or receive any data or information from one or more devices or systems, e.g. the mobile communication device, network management systems, and so on.

The apparatus may be a server that may be operatively attached to the mobile communication device. The apparatus may be a mobile communication device.

The apparatus may further comprise a fifth processor adapted to trigger one or more actions if the mobile communication device is determined to have exited the defined geographical area. To trigger the actions the fifth processor may be adapted to interact or communicate with one or more inputs, outputs, memory and so on in order to transmit or perform the actions that are to be triggered.

The fourth processor may be further adapted to periodically determining the location of the mobile communication device.

The third processor may be further adapted to determine if the mobile communication device is moving and, if so, determine the location of the mobile communication device.

The apparatus may further comprise a sixth processor adapted to maintain a record of the defined geographical area and the mobile communication device associated with the defined geographical area.

The apparatus may further comprise a first input adapted to receive an identification of the cell that the mobile communication device is in communication with from the mobile communication device.

The second processor may be further adapted to determine a geographical coverage area of the identified cell; and compare the geographical coverage area of the identified cell with the defined geographical area.

The third processor may be further adapted to instruct the mobile communication device to obtain its location; and the apparatus may further comprise a second input adapted to receive the location of the mobile communication device.

The first processor through to sixth processor may be the same processor, different processors, or any combination thereof. The first input and second input may be the same input or different inputs.

The apparatus may comprise the hardware, software or a combination thereof in order to perform or implement any or all of the functions in accordance with the aspects of the invention.

According to a fourth aspect of the present invention there is provided a computer program product for detecting when a mobile communication device exits a defined geographical area wherein the defined geographical area includes one or more cells; the computer program product comprising computer readable executable code for: identifying a cell that the mobile communication device is in communication with; determining if the identified cell is a boundary cell, wherein a boundary cell is a cell in which a boundary of the defined geographical area is within the cell; determining a location of the mobile communication device if the identified cell is the boundary cell; and comparing the location of the mobile communication device with the boundary of the defined geographical area to detect if the mobile communication device has exited the defined geographical area.

The computer program product may further comprise computer readable executable code for performing any or all of the functions in accordance with the aspects of the invention.

Embodiments of the present invention will now be described, by way of example only, and with reference to the accompanying drawings, in which:

FIG. 1 shows a simplified block diagram of a system in accordance with many of the embodiments of the present invention.

FIG. 2 shows a simplified cell and geo-fence arrangement in accordance with many of the embodiments of the present invention.

With reference to FIG. 1, a system 101 in accordance with many of the embodiments.

The system 101 may include an application 102 where the application may be on a computing device, e.g. a server, or may be a module which may be part of mobile operator's network or management systems. The application 102 may be on a computing device, e.g. server, or may be a module that belongs to a service provider which provides a service of Geo-Fences. The application 102 may be part of a mobile device 103. The functionality of the application 102 of may be split between two or more entities, e.g. split between a server and a mobile device.

The application 102 receives or stores one or more defined Geo-Fences. The Geo-Fence is defined in terms of real-world coordinates and may be defined by a party 106, for example, an individual user, a company, an organisation, and so on. The party 106 may define the Geo-Fence by, for example, drawing a boundary or perimeter for the Geo-Fence on a map, entering the real-world coordinates, or by any other means to define the boundary of the Geo-Fence.

The Geo-Fence may define an area for an associated mobile device 103 to remain within and therefore not to exit the boundary of the Geo-Fence, or the Geo-Fence may define an area the mobile device 103 is not to enter.

The party 106 defining the Geo-Fence may also indicate the mobile devices 103 which the defined Geo-Fence relates to or is to be associated with, which is received and/or stored in the application 102. The application 102 may further receive control parameters relating to the Geo-Fence and/or associated mobile devices 103, for example, one or more time periods that the Geo-Fence is to be active for the associated mobile device 103, one or more actions to trigger if the mobile device 103 is determined to be entering and/or exiting the defined Geo-Fence, e.g. to whom, how or where notifications or alerts are to be transmitted, and so on.

The party 106 defining the Geo-Fence boundary and providing any additional control parameters to the application 102 may do so directly into the application 102, for example, if the application 102 is part of the mobile device 103, or may do so via one or more networks 107, for example, where the party 106 operatively connects with the application 102 from the party's 106 own computing or mobile device.

The application 102 may maintain or store a record or database of the geographical location of Base Stations (BS) 108, or the application 102 may be operatively connected to the database of BSs 108. Each BS 108 serves a cell 109 where the geographical size of the cell 109 is known or can be determined based on any, or all, of the location of the BS 108, local geographical features, signal strength of the BS 108, and so on. The application 102 and/or the database may receive the information or data relating to the geographical location of BSs 108, and/or the cells 109 from the network operator of a mobile communication network, for example, from the Network Management Systems (NMS) 105. The application 102 may only store the information relating to one mobile network operator's BSs 108, and/or cells 109 if the application 102 is part of the mobile network operator's network. However, if the application 102 is provided by a third party, for example, a service provider, then the application 102 may operatively communicate via network 107 with one or more NMSs 105 relating to one or more mobile network operators to obtain or receive each of the mobile network operators BS 108 and/or cells 109 geographical locations and/or geographical coverage.

The mobile device 103 includes the capability to communicate with BSs 108 of a mobile communication network and the capability to obtain or determine its location using Global Positioning System (GPS) 104. For example, the mobile device 103 may be a mobile telephone, or any other device that is capable of communication with BSs 108 and obtaining or determining its location via GPS 104.

Presently, a mobile network operator's network may contain or include hundreds, if not thousands, of BSs 108 which, via the geographical coverage of the associated cell 109, typically covers vast and substantial geographical areas.

A mobile device 103 when active will substantially continuously communicate with the mobile communication network, in particular, the mobile device 103 will communicate with BSs 108 of cells 109 that cover the geographical area that the mobile device 103 is located. This enables the mobile device 103 to transmit data to and/or receive data from the mobile communication network, e.g. to enable the mobile device 103 to make or receive voice calls, messages (e.g. Short Message Service (SMS) message, Multimedia Message Service (MMS) messages, etc), Internet data, and so on. Thus, the mobile device 103 and/or the mobile communication network (e.g. in the NMS 105) will know or record an identification of the BS 108 and/or the cell 109 that the mobile device 103 is in communication with.

As described above, the application 102 maintains one or more defined Geo-Fences, the mobile devices 103 associated with the one or more Geo-Fences and a database of BSs 108 and/or cells 109 in order to identify the geographical coverage area of each cell 109.

In order to reduce the consumption of the battery power of the mobile device 103 and still be able to accurately determine whether the mobile device 103 has entered into and/or excited from an area defined by a Geo-Fence, the application 102 receives an identification of the BS 108 (which can be used by the application 102 to determine the cell 109 served by the BS 108) or the application may receive an identification of the cell 109 that a mobile device 103 associated with a Geo-Fence is in communication with. In both examples, the application 102 can determine the geographical area covered by the cell 109 and therefore determine the geographical area that the mobile device 103 is located within.

The application 102 may receive the identification of the BS 108 and/or the cell 109 that the mobile device 103 is in communication with directly from the mobile device 103 over one or more networks 107 or the application may receive the identification of the BS 108 and/or the cell 109 for the mobile device 103 from the mobile network operator, e.g. from the NMS 105, over one or more networks 107.

In the case that the application receives the BS 108 and/or cell 109 identification data directly from the mobile device 103 then the mobile device may transmit the identification data to the application 102 periodically (e.g. every 10 seconds, every 30 seconds, every minute, every 5 minutes, every 10 minutes, or any other suitable time period), may transmit the identification data each time the identification data changes (e.g. the BS 108 or cell 109 have changed), or at any other suitable time. The mobile device 103 may be installed with a command or module that automatically transmits the identification data to the application 102.

In the case that the application 102 receives the identification data for a mobile device 103 from the NMS 105 (or other mobile network operator system) the NMS 105 may transmit the identification data the application 102 periodically (e.g. every 10 seconds, every 30 seconds, every minute, every 5 minutes, every 10 minutes, or any other suitable time period), may transmit the identification data each time the identification data changes, or at any other suitable time.

The application 102 may identify the defined Geo-Fence that is associated with the mobile device 103 for which the application has received the BS 108 and/or cell 109 identification data. For example, the application 102 may also receive an identification of the mobile device 103 which the application 102 may utilise to identify the Geo-Fence associated with the mobile device 103.

The application 102 may compare the geographical area of the cell 109 within which the mobile device 103 is located, with the defined Geo-Fence that is associated with the mobile device 103.

If the Geo-Fence defines a real-world geographical area that the mobile device 103 is not to exit then the application 102 may identify or determine from the comparison whether the cell 109 is an interior cell. An interior cell is one that the geographical area covered by the cell is contained entirely within the defined boundary of the Geo-Fence associated with the mobile device 103. Therefore, the exact location of the mobile device 103 is not required as the mobile device 103 is not in the proximity of a boundary of the defined Geo-Fence.

If it is determined or identified from the comparison of the cell 109 and a defined boundary of the Geo-Fence that the geographical area of the cell 109 includes a boundary of the Geo-Fence then the cell 109 is categorised as a boundary cell, e.g. a cell that contains a boundary of the Geo-Fence. As the mobile device 103 may be located anywhere in the boundary cell then the mobile device 103 may be outside of the boundary of the defined Geo-Fence.

Thus, the application 102 may then trigger the mobile device 103 to activate its GPS chip on the mobile device 103 and obtain its GPS location data for the mobile device 103 from the GPS system 104. The GPS location data for the mobile device 103 is an accurate indication of the geographical location of the mobile device 103 which may then be provided to the application 102. The application 102 may use the accurate geographical location to determine whether the mobile device 103 is inside or outside the geographical area as defined by the Geo-Fence boundary associated with the mobile device 103.

If, based on the first GPS geographical location data received by the application 102 from the mobile device 103, the application 102 determines that the mobile device 103 is within the boundary of the defined Geo-Fence then the application 102 may request or instruct the mobile device 103 to periodically report or provide its GPS location data. The mobile device 103 may periodically report or provide its GPS location data whilst the mobile device 103 is present in the boundary cell.

The application 102 may then periodically, on receiving further GPS location data for the mobile device 103 determine or identify whether the GPS location of the mobile device 103 is inside or outside a boundary of the associated Geo-Fence. The period between the mobile device 103 determining its GPS location data and reporting it to the application 102 may be any suitable time period for the purpose of determining whether the mobile device 103 has exited the associated Geo-Fence. For example, it may be every 30 seconds, every minute, every 5 minutes, and so on.

However, by instructing or requesting the mobile device 103 to periodically determine and provide its GPS location data whilst the mobile device 103 is in a boundary cell may again significantly increase the power consumption and lower the battery life and efficiency. Therefore, if the first GPS location data is determined by the application 102 as being within the boundary of the associated Geo-Fence then the application 102 may only request GPS location data or the mobile device 103 may only determine its GPS location data, if the mobile device 103 is identified or determined as moving. If the mobile device 103 is not moving then there is no need to periodically report or provide its GPS location data to the application 102.

The mobile device 103 may determine itself if it is moving and, if it is moving, the mobile device 103 may determine its GPS location data and provide the data to the application 102. There are several mechanisms for determining if a mobile device 103 is moving, for example, the mobile device 103 may comprise an accelerometer.

Alternatively, the BS 108, NMS 105, the application 102, or a combination thereof, may determine the mobile device 103 is moving by utilising telecommunication mechanisms that are present in the network.

For example, in Global System for Communication (GSM) networks the mechanism of Timing Advance (TA) may be utilised to determine or identify whether the mobile device 103 is moving. In TA the time period for a signal to travel from the mobile device to the base station can be determined. The TA value is primarily used to assign timeslots to the mobile device but the time period may also be used to determine distance of the mobile device from the base station. Thus, if the TA value and therefore the distance to the base station changes then the mobile device 103 is moving and will determine its GPS location data and provide it to the application 102. The determination as to whether the mobile device 103 is moving may also include parameters (such as the TA value in GSM) relating to neighbouring cells that the mobile device 103 may also be in communication with.

Accordingly, the mobile device 103 only uses GPS when the mobile device 103 is determined or identified to be near to, or in the proximity of a boundary of a Geo-Fence associated with the mobile device 103. Thus, the power consumption is reduced and battery life extended for the mobile device 103. In addition by determining when the mobile device 103 is moving before obtaining further GPS location data further reduces power consumption and prolongs the battery life.

If the application 102, based on the GPS location data for the mobile device 103, determines that the location of the mobile device 103 is outside the boundary of the associated Geo-Fence then the application 102 may perform any number of actions. The actions for a particular mobile device 103, a particular Geo-Fence or standard actions may be stored in the application 102 and triggered once the mobile device 103 is outside the boundary of the Geo-Fence.

For example, if it is determined that the mobile device 103 has moved outside the geographical area defined by the associated Geo-Fence boundary the application 102 may identify or determine if there are associated actions to trigger or whether standard actions are to be triggered. For example, the party defining the Geo-Fence may define that the action to trigger is to transmit a notification, by for example, an SMS message, to a defined mobile telephone. Thus, when the mobile device 103 moves outside the boundary of the Geo-Fence then the application 102 determines that the action to trigger is to transmit an notification to the defined mobile telephone.

If the application 102 determines or identifies from the comparison of the cell 109 and the defined boundary of the Geo-Fence that the geographical area of the cell 109 is entirely outside of the boundary of the Geo-Fence then the cell 109 may be categorised as an exterior cell, e.g. a cell that is completely outside a boundary of the Geo-Fence. If it is determined that the mobile device 103 is located in an exterior cell then the application may trigger one or more actions.

As will be appreciated, any number of different actions may be triggered by the application 102, for example, transmitting notifications or alerts by e-mail, SMS, MMS, and so on. The actions may include triggering a voice call to a party, record or maintain a list of dates, times, etc of each time the mobile device 103 leaves the geographical area defined by the Geo-Fence. The actions may include triggering one or more other devices to activate/de-activate, e.g. trigger a heating/cooling device to turn on/turn off. The actions may include triggering the immobilisation of a vehicle or additional charging if the vehicle is a rental vehicle and it leaves a designated area for the rental. The actions that can be defined and triggered by the application 102 may include any action that is suitable for the purpose of the Geo-Fence.

In the above described embodiments, the Geo-Fence defined a geographical area that the mobile device 103 was to remain within and actions are triggered when the mobile device 103 is determined to move outside of the Geo-Fence. However, as will be appreciated, the Geo-Fence may define a geographical area that the mobile device may not enter, or the mobile device 103 owner may want to know if they enter or stray into a particular area, and so on. The determinations and identifications are the same as described hereinabove, and as will be appreciated in this case the interior cells are those in which the mobile device is allowed to be, which in this case would be cells entirely located outside of the boundary defining the Geo-Fence. Boundary cells will be the same as above and exterior cells will be those cells that are entirely located on the side of the boundary that the mobile device should not be.

Also, the Geo-Fence for an associated mobile device 103 may be used to trigger actions, e.g. transmit notifications, when the mobile device 103 moves both inside and outside of the boundary of the Geo-Fence. The application 102 may utilise the mechanisms for determining movement in a boundary cell to determine if the mobile device is moving inside or outside of the defined Geo-Fence. Or the application 102 may track historical data for the mobile device 103 so as to determine that previously the mobile device 103 was in an interior cell and now in a boundary cell therefore being able to determine that the mobile device 103 is leaving the area defined by the Geo-Fence.

Accordingly, many of the embodiments describe a mechanism to accurately determine whether a mobile device has entered into, or left a Geo-Fence as defined by the Geo-Fence boundary whilst efficiently consuming power and pro-longing battery life of the mobile device.

An example will now be described with reference to FIG. 2, which shows a simplified partial view of a cell and geo-fence arrangement 201.

The party defining the Geo-Fence may be a homeowner who travels away from their home 205 often for a period of time and may want peace of mind that whilst they are away that the heating system in their home 205 is turned off, even if the homeowner forgets to turn off their heating before travelling.

The homeowner frequently visits places (e.g. workplace, friends' homes, shops, restaurants, pubs, and so on) within a radius of, for example, 10 miles of their home 205. Thus, to differentiate between normal "everyday" travel and travelling away from the home 205 (e.g. a holiday, business travel, and so on) the homeowner defines a boundary 202 for the Geo-Fence of a 15 mile radius from their home 205. The homeowner may connect to an application to define the boundary 202 of the Geo-Fence, to associate the homeowner's mobile device 204 to the defined Geo-Fence, and to define the actions the application is to trigger.

The actions that the homeowner defines in this example is to transmit a command to the homeowner's heating system at their home 205 to turn off the heating system and to transmit a notification to the mobile device 204 that the heating has been turned off.

The homeowner may also define one or more parameters relating to the use of the Geo-Fence. For example, the homeowner may state that the mobile device 204 must be outside the Geo-Fence boundary for a particular amount of time before turning off the heating system or to specify the dates that the Geo-Fence is to be active.

Therefore, whilst the mobile device 204 of the homeowner is turned on the application receives the cell 203 identification information that the mobile device is located in and the application compares the cell 203 identification information with the defined Geo-Fence associated with the mobile device 204.

When the homeowner is going about their "normal" daily business within 10 miles of their home 205, for example, when the mobile device 204 is at location 204a then the application will receive identification information for cell 203g. The application determines based on the cell information stored in a database in or operatively connected to the application that cell 203g is an interior cell, in other words that the geographical coverage area of the cell 203g is entirely within the boundary of the defined Geo-Fence.

When the homeowner is travelling away from their home 205 and the mobile device 204 is at location 204b then the application will receive identification information for cell 203b. The application determines based on the cell information stored in a database in or operatively connected to the application that cell 203b is a boundary cell, in other words that the geographical coverage area of the cell 203b includes a boundary of the defined Geo-Fence. The application then requests that the mobile device 204b activates its GPS chip and obtains its GPS location data. The application then receives the GPS location data of mobile device 204b which the application compares with the boundary of the Geo-Fence associated with mobile device 204.

At location of the mobile device 204b the application determines that the mobile device 204 is still within the boundary of the defined Geo-Fence associated with the mobile device 204 based on the GPS location data of mobile device 204b and the geographical information of the boundary of the Geo-Fence.

The application may request the mobile device 204b to periodically provide its GPS location data, or, as in this example, the mobile device 204 will provide its GPS location data once the mobile device is moving or has moved in order to further reduce power consumption and prolong battery life of the mobile device 204.

In this example, the movement of the mobile device 204 is detected using accelerometer(s) in the mobile device 204. The mobile device 204 determines when it is moving via the accelerometers at which point the mobile device 204 activates its GPS chip and obtains its GPS location data. Alternatively, the accelerometer output may be monitored by the application and, once the application detects that the mobile device 204 is moving it may request the mobile device 204 to provide its GPS location data.

At a point in time, mobile device 204 of the homeowner moves from mobile device location 204b to mobile device location 204c. At this point, the mobile device activates its GPS chip and obtains its GPS location data which it provides to the application.

The application compares the received GPS location data of mobile device 204c with the geographical location of the boundary 202 of the defined Geo-Fence associated with the mobile device 204. The application determines that mobile device 204c is outside the boundary 202 of the Geo-Fence and therefore will trigger one or more actions. The application identifies the actions associated with the mobile device 204 and/or the defined Geo-Fence which in this case are to instruct the heating system at the home 205 to turn off and to notify this to mobile device 204.

The application triggers these actions, such that an instruction or command is transmitted to the heating system at the home 205, where on receipt of the command the heating system turns off. The application further triggers an SMS message to be transmitted to mobile device 204 to inform the homeowner that the heating at their home 205 has been turned off.

Accordingly, the embodiments of the present invention provide a mechanism to reduce power consumption on mobile devices whilst accurately determining whether the mobile device has crossed a boundary as defined by a Geo-Fence.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

I claim:

1. A method of detecting when a mobile communication device exits a defined geographical area wherein said defined geographical area includes one or more cells, said method comprising:
   identifying a cell that said mobile communication device is in communication with;
   determining if said identified cell is a boundary cell, wherein a boundary cell is a cell in which a boundary of said defined geographical area is within said cell;
   determining a location of said mobile communication device if said identified cell is said boundary cell; and
   comparing said location of said mobile communication device with said boundary of said defined geographical area to detect if said mobile communication device has exited said defined geographical area.

2. The method as claimed in claim 1, further comprising:
   triggering one or more actions if said mobile communication device is determined to have exited said defined geographical area.

3. The method as claimed in claim 1, in which said step of determining said location of said mobile communication device further comprises:
   periodically determining said location of said mobile communication device.

4. The method as claimed in claim 1, in which said step of determining said location of said mobile communication device further comprises:
   determining if said mobile communication device is moving and, if so, determining said location of said mobile communication device.

5. The method as claimed in claim 1 further comprising:
   receiving an identification of said cell that said mobile communication device is in communication with from said mobile communication device.

6. The method as claimed in claim 1 in which said step of determining if said identified cell is a boundary cell comprises:
   determining a geographical coverage area of said identified cell; and
   comparing said geographical coverage area of said identified cell with said defined geographical area.

7. The method as claimed in claim 1 in which said step of determining said location of said mobile device comprises:
   instructing said mobile communication device to obtain its location; and
   receiving said location of said mobile communication device.

8. An apparatus for detecting when a mobile communication device exits a defined geographical area wherein said defined geographical area includes one or more cells, said apparatus comprising:
   a first processor configured to identify a cell that said mobile communication device is in communication with;
   a second processor configured to determine if said identified cell is a boundary cell, wherein a boundary cell is a cell in which a boundary of said defined geographical area is within said cell;
   a third processor configured to determine a location of said mobile communication device if said identified cell is said boundary cell; and
   a fourth processor configured to compare said location of said mobile communication device with said boundary of said defined geographical area to detect if said mobile communication device has exited said defined geographical area.

9. The apparatus as claimed in claim 8, further comprising:
   a fifth processor configured to trigger one or more actions if said mobile communication device is determined to have exited said defined geographical area.

10. The apparatus as claimed in claim 8, in which said fourth processor is further configured to:
    periodically determine said location of said mobile communication device.

11. The apparatus as claimed in claim 8, in which said third processor is further configured to:
    determine if said mobile communication device is moving and, if so, determine said location of said mobile communication device.

12. The apparatus as claimed in claim 8, further comprising:
    a first input configured to receive an identification of said cell that said mobile communication device is in communication with from said mobile communication device.

13. The apparatus as claimed in claim 8 in which said second processor is further configured to:
    determine a geographical coverage area of said identified cell; and
    compare said geographical coverage area of said identified cell with said defined geographical area.

14. The apparatus as claimed in claim 8, in which said third processor is further configured to instruct said mobile communication device to obtain its location, and said apparatus further comprising:
    a second input adapted to receive said location of said mobile communication device.

15. A computer program product embodied on a computer-readable medium, for detecting when a mobile communication device exits a defined geographical area wherein said defined geographical area includes one or more cells, said computer program product comprising computer readable executable code which, when run on a processor, controls said processor to perform a method comprising:
    identifying a cell that said mobile communication device is in communication with;
    determining if said identified cell is a boundary cell, wherein a boundary cell is a cell in which a boundary of said defined geographical area is within said cell;
    determining a location of said mobile communication device if said identified cell is said boundary cell; and
    comparing said location of said mobile communication device with said boundary of said defined geographical area to detect if said mobile communication device has exited said defined geographical area.

* * * * *